United States Patent [19]

Ohta et al.

[11] Patent Number: 4,756,190
[45] Date of Patent: Jul. 12, 1988

[54] DIRECT-HEATED FLOW MEASURING APPARATUS HAVING UNIFORM CHARACTERISTICS

[75] Inventors: Minoru Ohta, Okazaki; Michitoshi Onoda, Toyohashi; Kazuhiko Miura, Aichi; Seizi Huzino, Anjo; Tadashi Hattori, Okazaki, all of Japan

[73] Assignee: Nippon Soken, Inc., Nishio, Japan

[21] Appl. No.: 894,895

[22] Filed: Aug. 8, 1986

[30] Foreign Application Priority Data

Aug. 9, 1985 [JP] Japan ................. 60-174341
Aug. 12, 1985 [JP] Japan ................. 60-175652
Aug. 15, 1985 [JP] Japan ................. 60-178522

[51] Int. Cl.⁴ .................................. G01F 1/68
[52] U.S. Cl. .................................. 73/204
[58] Field of Search .......................... 73/204

[56] References Cited

U.S. PATENT DOCUMENTS

3,747,577  7/1973  Mauch et al. .
3,975,951  8/1976  Kohama et al. .
4,279,146  7/1981  Wessel et al. .
4,513,615  4/1985  Sato et al. ............... 23/204
4,559,814 12/1985  Sato et al. ............... 73/204
4,627,279 12/1986  Ohta et al. .

Primary Examiner—Herbert Goldstein
Attorney, Agent, or Firm—Cushman, Darby & Cushman

[57] ABSTRACT

In a direct-heated flow measuring apparatus including a film resistor having a substrate and a resistance layer thereon, the substrate is supported by a supporting member in a passage. Provided between the substrate and the supporting member is an adiabatic member for enhancing the adiabatic effect of the resistance layer. The substrate is adhered by adhesives having an excellent thermal conductivity coefficient to the adiabatic member, and the supporting member is also adhered by adhesives having an excellent thermal conductivity coefficient to the adiabatic member.

15 Claims, 10 Drawing Sheets

DIRECT-HEATED FLOW MEASURING APPARATUS HAVING UNIFORM CHARACTERISTICS

BACKGROUND OF THE INVENTION

1. Field of the Invention

The present invention relates to a direct-heated flow measuring apparatus having a film resistor which serves as a temperature detecting means as well as an electric heater. Such a direct-heated flow measuring apparatus can be used, for example, for measuring the flow rate of engine intake air.

2. Description of the Related Art

Generally, in an internal combustion engine, the amount of intake air is one of the most important parameters for controlling the fuel injection amount, ignition timing, and the like. A flow measuring apparatus, i.e., an airflow meter, is provided for measuring the same. One of the more common prior art airflow meters is the vane-type, but this is disadvantageous in scale, response speed characteristics, and the like, and therefore, airflow meters having temperature-dependent resistors have been developed, in which these disadvantages of scale, response speed characteristics, and the like are avoided (see: U.S. Pat. No. 3,975,951).

There are two types of airflow meters having temperature-dependent resistors, i.e., the heater-type and direct-heated type. The heater-type airflow meter may consist of an electric heater resistor provided in an intake-air passage of an engine and two temperature-dependent resistors arranged on the upstream and downstream sides of the electric heater resistor. In this case, the temperature-dependent resistor on the downstream side is used for detecting the temperature of air heated by the heater resistor, while the temperature-dependent resistor on the upstream side is used for detecting the temperature of non-heated air. The current flowing through the heater resistor is controlled to provide a constant difference in temperature between the two temperature-dependent resistors, and thus the mass flow rate of air is determined by detecting the voltage applied to the heater resistor.

In this heater-type airflow meter, if an upstream temperature-dependent resistor is not provided and the current of the heater resistor is controlled to provide a constant temperature of the downstream temperature-dependent resistor, the voltage applied to the heater resistor is detected as representing the volume flow rate of air.

On the other hand, the direct-heated type airflow meter may consist of a film resistor which serves not only as an electric heater, but also as a temperature-detecting means for detecting the temperature of the heated air. Also, the direct-heated type airflow meter may consist of a temperature-dependent resistor for detecting the temperature of non-heated air. Thus, the current flowing through the film resistor is controlled to provide a constant difference in temperature between the film resistor and the temperature dependent resistor, thereby detecting the voltage applied to the film resistor as representing the mass flow rate of air. In this direct-heated type airflow meter, too, if a temperature-dependent resistor is not provided and the current of the heater resistor is controlled to provide a constant temperature of the film resistor, the voltage applied to the film resistor is detected as representing the volume flow rate of air.

Since the film resistor of the direct-heated type airflow meter serves as a temperature-detecting means for heated air, that is, an additional temperature detecting means for heated air is not necessary, the direct-heated type airflow meter is smaller in size than the heater-type airflow meter.

In the direct-heated type airflow meter, the film resistor may consist of an insulating substrate such as a ceramic substrate or monocrystalline silicon substrate, a resistance pattern layer of platinum (Pt), gold (Au), etc. on the insulating substrate, and a heat-resistant resin or a passivation layer on the resistance pattern layer.

Usually, the response characteristics and dynamic range of the direct-heated type airflow meter are dependent upon the heat mass and adiabatic efficiency of the heating and temperature detecting portion of the resistance pattern layer, which serves not only as a heating means but also as a temperature detecting means. In order to obtain the most excellent response characteristics and largest dynamic range, the above-mentioned portion should be ideally in a completely floating state in the air stream.

For this purpose, there may be suggested a direct-heated airflow meter in which the substrate is fixed by an adiabatic member to a supporting member having good heat dissipation characteristics. In this case, the adhesion between the substrate and the adiabatic member and the adhesion between the adiabatic member and the supporting member are carried out by using adhesives having an adiabatic effect, thus further enhancing the adiabatic effect of the heater and temperature detecting portion. Such adhesives are, for example, resin adhesives, frit glass, and the like.

The thickness state, and the like of the above-mentioned adhesives, however, fluctuate according to the manufacturing conditions thereof, and accordingly, the adiabatic effect thereof is fluctuated. Thus, fluctuations occur in the response characteristics and dynamic range of the airflow meter.

SUMMARY OF THE INVENTION

It is an object of the present invention to provide a direct-heated flow measuring apparatus in which no change occurs in the response characteristics and dynamic range due to the manufacturing conditions of adhering the adiabatic member to the substrate and to the supporting member.

According to the present invention, the substrate is adhered by adhesives having an excellent thermal conductivity coefficient to the adiabatic member, and the supporting member is also adhered by adhesives having an excellent thermal conductivity coefficient to the adiabatic member. As a result, the adiabatic effect is dependent only upon the adiabatic member, and accordingly, the adiabatic effect for the heating and temperature detecting portion of the film resistor is uniform regardless of the manufacturing conditions.

BRIEF DESCRIPTION OF THE DRAWINGS

The present invention will be more clearly understood from the description as set forth below with reference to the accompanying drawing, wherein.

DESCRIPTION OF THE PREFERRED EMBODIMENTS

Figure 1:
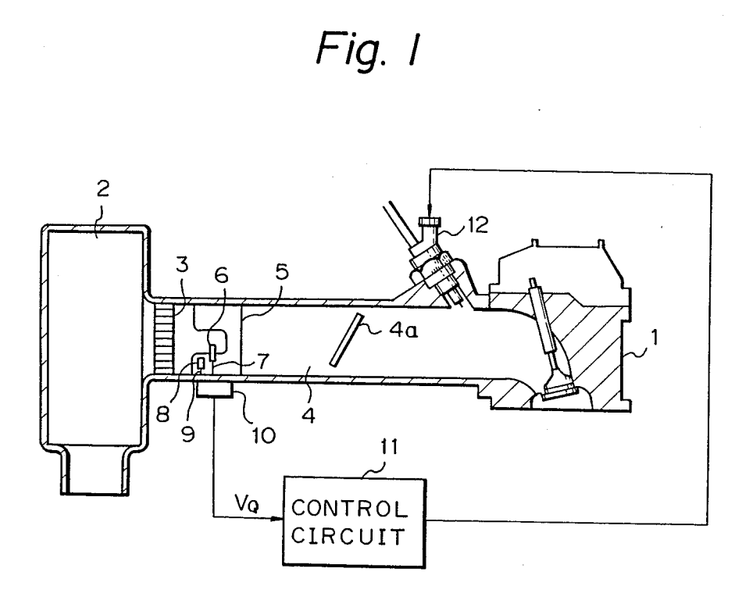
FIG. 1 is a schematic diagram showing the overall configuration of an internal combustion engine including an embodiment of the direct-heated flow measuring apparatus according to the present invention.

In FIG. 1, which illustrates the overall configuration of an internal engine including embodiment of the flow measuring apparatus according to the present invention, reference numeral 1 designates a spark ignition engine for driving an automobile in which air for combustion is sucked through an air cleaner 2, a rectifier grid 3 for making the air flow uniform, and an intake air passage 4. Provided in the intake air passage 4 is a throttle valve 4a arbitrarily operated by a driver. The flow measuring apparatus is provided in the intake air passage 4 between the rectifier grid 3 and the throttle valve 4a.

The flow measuring apparatus includes a sensing portion inside of the intake air passage 4 and a sensor circuit 10 encapsulated in a hybrid board outside of the intake air passage 4. The sensing portion includes a supporting member 5 (such as aluminium) which supports a temperature-dependent resistor (film resistor) 6 in the intake air passage 4. The film resistor 6, which includes a heating and temperature-detecting portion, is connected via a flexible connection 7 to the sensor circuit 10. The supporting member 5 also supports a temperature-dependent resistor 8 for detecting the temperature of non-heated air in the intake air passage 4. The temperature-dependent resistor 8 is connected via a flexible connection 9 to the sensor circuit 10. Note that the temperature-dependent resistor 8 is disposed within the intake air passage 4 in such a way that the resistor 8 is not substantially affected by the heat generated from the film resistor 6, and there is no substantial fluctuation of the air stream against the film resistor 6.

The sensor circuit 10 controls the current flowing to the film resistor 6 to generate heat to provide a constant difference in temperature between the film resistor 6 and the temperature-dependent resistor 8. Also, the sensor circuit 10 generates and transmits an output voltage $V_Q$ to the control circuit 11, which includes, for example, a microcomputer. The control circuit 11 also receives various kinds of detecting signals such as an engine speed signal Ne (not shown) and an engine coolant temperature signal THW (not shown) and controls the valve opening time period of a fuel injection valve 12 and the like.

Figure 2:
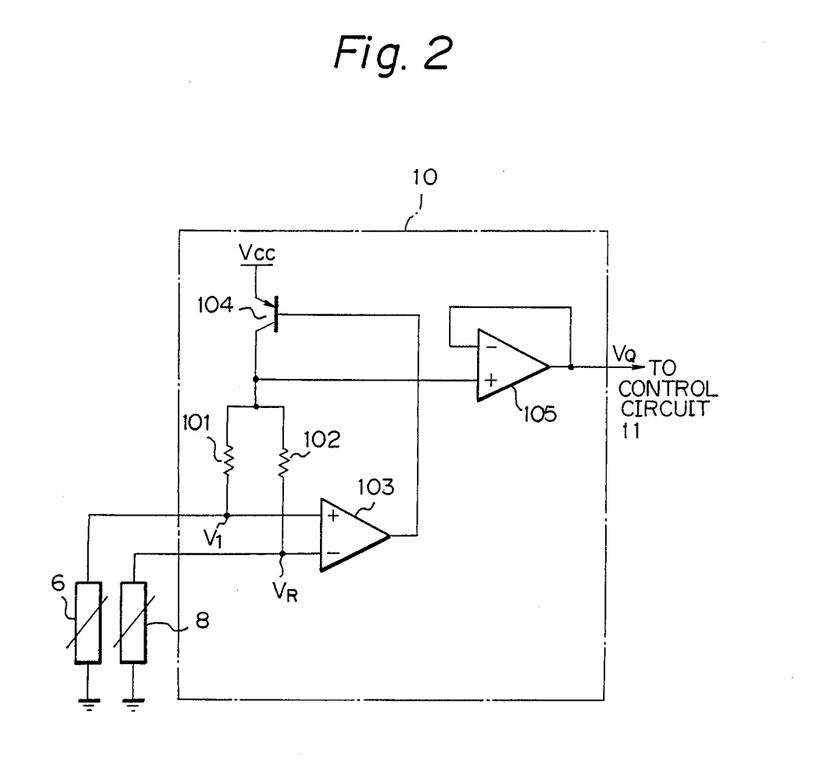
FIG. 2 is a circuit diagram of the sensor circuit of FIG. 1.

The sensor circuit 10 of FIG. 1 will be explained with reference to FIG. 2. In FIG. 2, the sensor circuit 10 includes resistors 101 and 102 which form a bridge circuit with the film resistor 6 and the temperature-dependent resistor 8; a comparator 103; a transistor 104 controlled by the comparator 103; and a voltage buffer 105. The sensor circuit 10 operates as follows. When the amount of air flowing through the intake air passage 4 increases, thus reducing the temperature of the film resistor 6, which is, in this case, a platinum resistor, the resistance value thereof decreases so as to satisfy the following condition:

$$V_1 \leq V_R$$

where $V_1$ is the potential at the node between the resistor 101 and the film resistor 6 and $V_R$ is the potential at the node between the resistor 102 and the temperature-dependent resistor 8. As a result, the output potential of the comparator 103 is reduced, thereby increasing the conductivity of the transistor 104. Therefore, the heat generated by the film resistor 6 is increased and, simultaneously, the collector potential of the transistor 104 is increased, so that the output voltage $V_Q$ of the voltage buffer 105 is also increased.

Contrary to this, when the amount of air flowing through the intake air passage 4 decreases, thus increasing the temperature of the film resistor 6, the resistance value thereof increases so as to satisfy the following condition:

$$V_1 > V_R.$$

As a result, the output potential of the comparator 103 is increased, thereby decreasing the conductivity of the transistor 104. Therefore, the heat generated by the film resistor 6 is decreased and, simultaneously, the collector potential of the transistor 104 is decreased, so that the output voltage $V_Q$ of the voltage buffer 105 is also decreased.

Thus, feedback control is performed upon the temperature of the film resistor 6 to provide a constant difference in temperature between the film resistor 6 and the temperature-dependent resistor 8, which, in this case, detects the temperature of the ambient air. Thus, the output voltage $V_Q$ of the output buffer 105 indicates the amount of air flowing through the intake air passage 4.

Figure 3:
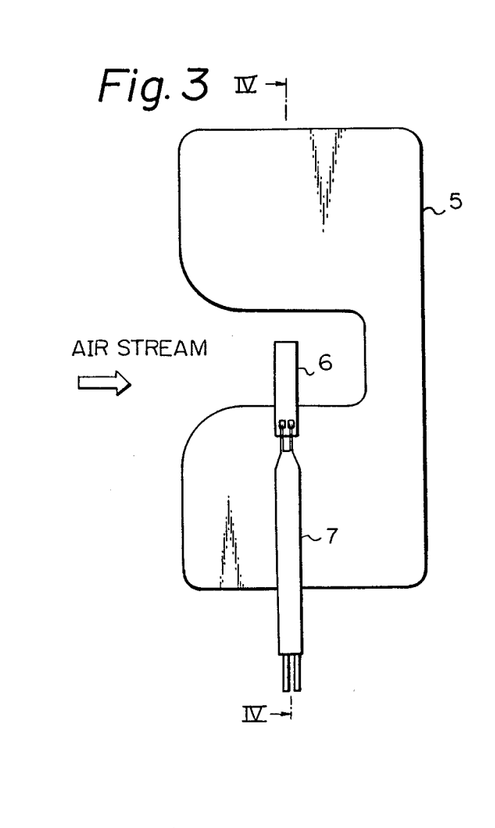
FIG. 3 is a plan view of the film resistor and the supporting member of FIG. 1.
Figure 4:
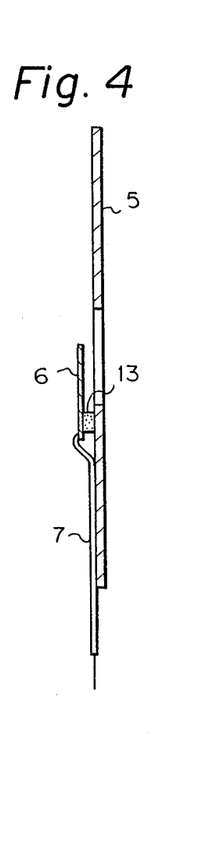
FIG. 4 is a cross-sectional view taken along the line IV—IV of FIG. 3.

FIG. 3 is an enlargement of FIG. 1 in the periphery of the film resistor 6, and FIG. 4 is a cross-sectional view taken along the line IV—IV. Note that the temperature-dependent resistor 8 and the flexible connector 9 are omitted from FIG. 3. As illustrated in FIGS. 3 and 4, only one end of the film resistor 6 is supported by an adiabatic member 13 in the supporting member 5, so that the face thereof having a resistance pattern thereon is parallel to the air stream, i.e., the minimum dimension portion of the film resistor 6 is opposed to the air stream. Note that, if both of the ends of the film resistor 6 are fixed to the supporting member 5, the sensor output is changed by the strain gauge effect of the film resistor 6, i.e., the strain of the film resistor 6. The support of the film resistor 6 by only one end thereof avoids this strain gauge effect.

Figure 5:
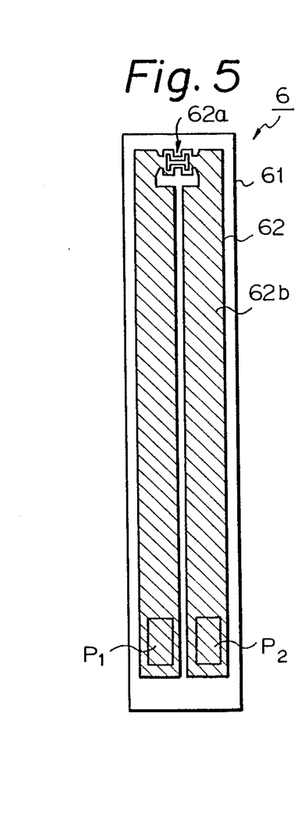
FIG. 5 is an enlargement of the film resistor of FIG. 3.

FIG. 5 is an enlargement of the film resistor 6 of FIG. 3. As illustrated in FIG. 5, the film resistor 6 comprises a monocrystalline silicon substrate 61 and a platinum (Pt) resistance pattern layer 62. Also, the passivation layer ($SiO_2$ or $Si_3N_4$) (not shown) is provided for protecting the Pt resistance pattern layer 62. Note that, in this case, the $SiO_2$ layer (not shown) obtained by thermally-oxidizing the substrate 61 is provided between the substrate 61 and the Pt resistance pattern layer 62. In the Pt resistance pattern layer 62, the portion 62a thereof having a particularly large resistance value serves not only as a heater by receiving a power supply, but also as a temperature-detecting portion by detecting a resistance value thereof. Note that $P_1$ and $P_2$ are lead take-out portions.

Figure 6:
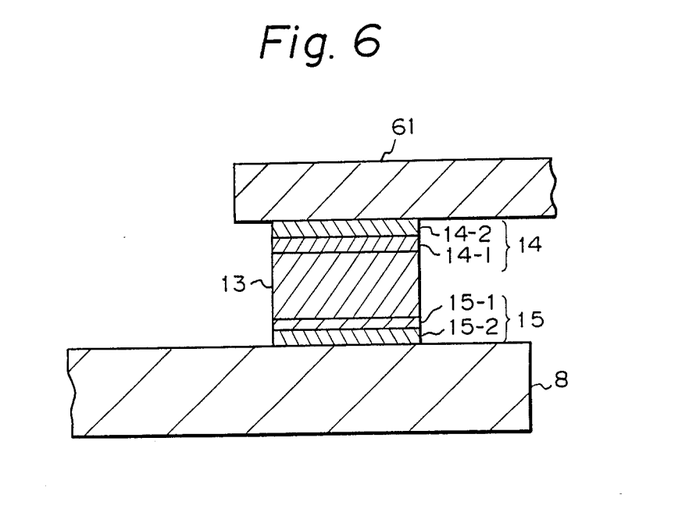
FIG. 6 is a cross-sectional view of the adiabatic member of FIG. 4.

FIG. 6 is a cross-sectional view of the periphery of the adiabatic member 13 of FIG. 4. As illustrated in FIG. 6, one face of the adiabatic member 13 is adhered by a first adhesive member 14 to the substrate 61 which is, in this case, made of monocrystalline silicon. The first adhesive member 14 may consist of an Au printing layer 14-1 and an Au-Si eutectic alloy layer 14-2. That is, the Au printing layer 14-1 is formed on the face of the adiabatic member 13 in advance, and then the adiabatic member 13 is pressed onto the substrate 61 at an appropriate pressure and at a temperature of about 400° C. Thus, the Au-Si eutectic layer 14-2 is produced between the Au printing layer 14-1 and the substrate 61, so that the adiabatic member 13 is adhered to the substrate 61.

On the other hand, another face of the adiabatic member 13 is adhered by a second adhesive member 15 to the supporting member 5 which is, in the case, made of Al or Cu. The second adhesive member 15 may consist of an electroless plating layer 15-1 and a Pb-Sn solder layer 15-2. That is, the electroless plating layer 15-1 is formed on the face of the adiabatic member 13 in advance, and then the Pb-Sn solder layer 15-2 is formed between the electroless plating layer 15-1 and the supporting member 5, so that the adiabatic member 13 is adhered to the supporting member 5.

Thus, since the adhesive members 14 and 15 have good thermal conductivity characteristics and the adiabatic member 13 has bad thermal conductivity characteristics, the adiabatic effect for the film resistor 6 is dependent only upon the adiabatic member 13. Therefore, even when the thickness, state, and the like of the adhesive members 14 and 15 are fluctuated, the adiabatic effect for the film resistor 6 is not fluctuated.

Figure 7:
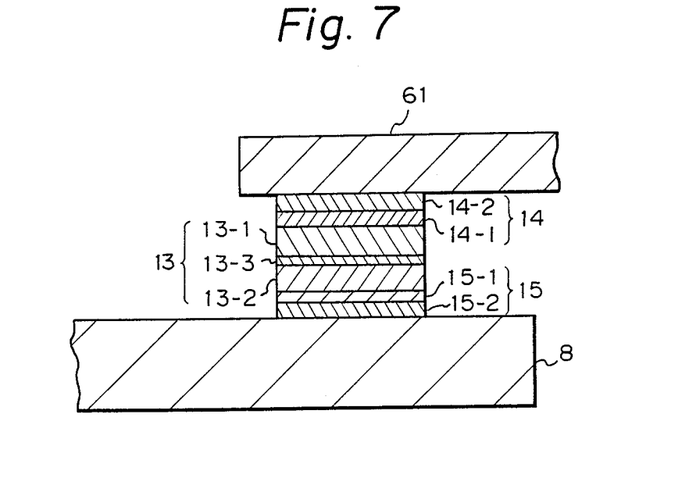
FIG. 7 is a modification of the adiabatic member of FIG. 6.
Figure 8:
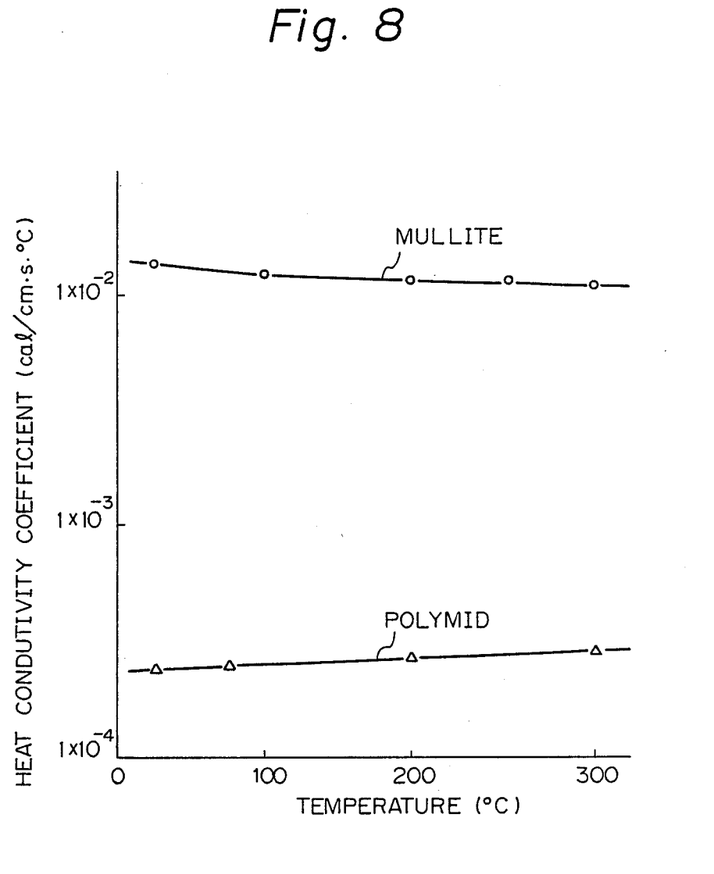
FIG. 8 is a graph showing the thermal conductivity characteristics of the adiabatic member of FIG. 7.

In FIG. 7, which is a modification of FIG. 6, the adiabatic member 13 consists of an adiabatic member 13-1 such as mullite having a negative thermal conductivity coefficient, as shown in FIG. 8, and an adiabatic member 13-2 such as polyimid having a positive thermal conductivity coefficient, as also shown in FIG. 8. The adiabatic members 13-1 and 13-2 are adhered to each other by heat-resistant adhesives 13-3. The thickness of the negative adiabatic member 13-1 and the thickness of the positive adiabatic member 13-2 are adjusted in such a way that the negative thermal conductivity characteristics of the adiabatic member are counteracted by the positive thermal conductivity characteristics of the adiabatic member 13-2. Thus, the thermal conductivity coefficient of the entire adiabatic member 13 can be uniform regardless of the temperature. Thus, even when the temperature is fluctuated, the heat dissipation characteristics of the adiabatic member 13 do not change, thus reducing any change of the sensor output $V_Q$ due to the change of the temperature.

For the negative thermal conductivity coefficient adiabatic member 13-1, ceramic material, glass material, and the like can be used instead of mullite. Also, for the positive thermal conductivity coefficient adiabatic member 13-2, other resins can be used instead of polyimid. Also, although the adiabatic members 13-1 and 13-2 are laminated in FIG. 7, the adiabatic members 13-1 and 13-2 can be mixed.

Figure 9:
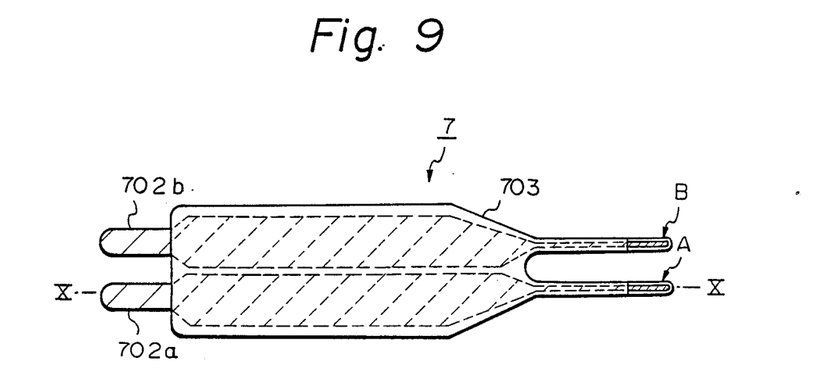
FIG. 9 is a plan view of the flexible connection of FIG. 1.
Figure 10:
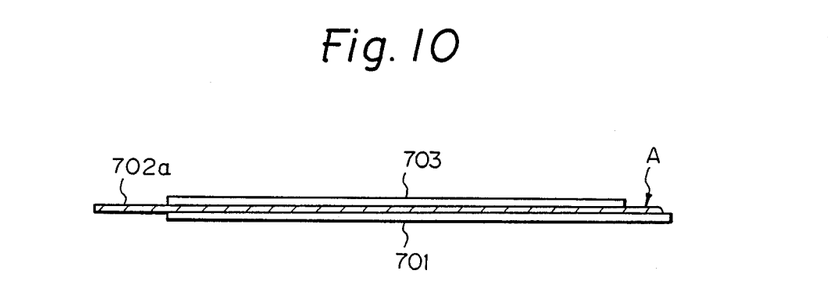
FIG. 10 is a cross-sectional view taken along the line X—X of FIG. 9.

FIG. 9 is an enlargement of the flexible connection 7 of FIG. 1, and FIG. 10 is a cross-sectional view taken along the line X—X of FIG. 9. As illustrated in FIGS. 9 and 10, the flexible connection 7 is comprised of a flexible insulating resin film 701, conductors (such as Cu) 702a and 702b, and a flexible insulating resin film 703. That is, the conductors 702a and 702b are sandwiched by the flexible insulating resin films 701 and 703. Connection portions A and B are connected to the lead take-out portions $P_1$ and $P_2$ of FIG. 5 by Au-Si eutectic alloy. Thus, the flexible connection 7 has a structure resistant to erosion, disconnection, and the like, as compared with bonding wires.

Figure 11:
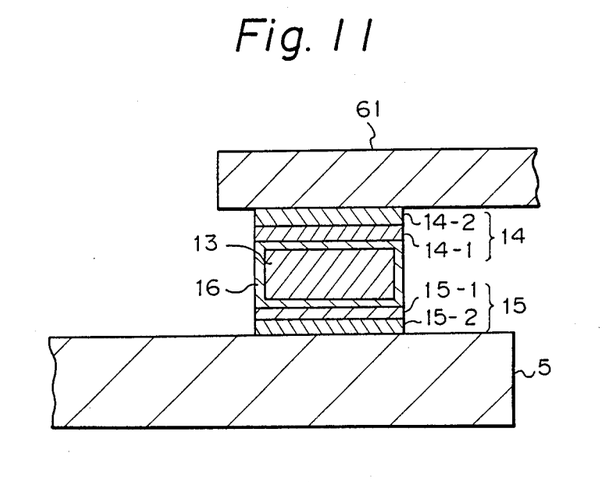
FIG. 11 is another modification of the adiabatic member of FIG. 6.

In FIG. 11, which is another modification of FIG. 6, the entire adiabatic member 13 is covered by a conductive layer 16 made of electroless plating Au, Pt, or Ni. Since the adhesive members 14 and 15 are also conductive the lead take-out portions $P_1$ and $P_2$ of the resistance layer 62 (see FIG. 5) are electrically connected to conductive layers 18a and 18b (see FIG. 12) on the supporting member 5. In this case, the adiabatic member 13 is provided for each of the lead take-out portions $P_1$ and $P_2$. Note that reference numeral 19 of FIG. 12 indicates an insulating layer for insulating the conductive layers 18a and 18b from the supporting member 5.

Figure 12:
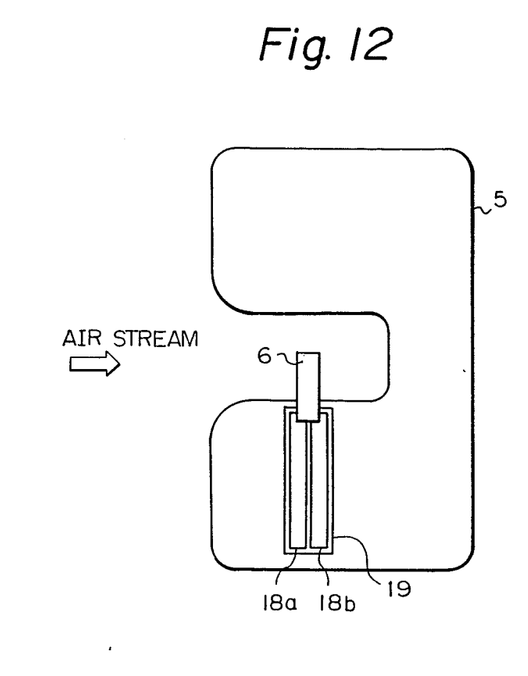
FIG. 12 is a modification of the film resistor and the supporting member of FIG. 3.

Thus, according to the structure of FIGS. 11 and 12 the resistance layer 62 of the film resistor 6 is connected to the conductive layers 18a and 18b via the conductive layer 16 formed on the adiabatic member 13, and thus the flexible connection 7 is not required.

Figure 13:
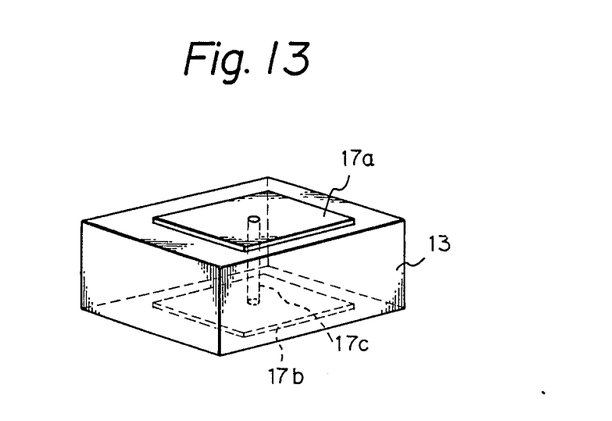
FIG. 13 is a still another modification of the adiabatic member of FIG. 6.

In FIG. 13, which is a further modification of FIG. 6 (FIG. 11), conductive plates 17a and 17b are formed on both faces of the adiabatic member 13, and a conductive rod 17c is provided at the center of the adiabatic member 13. Thus, the conductive plates 17a and 17b are electrically connected by the conductive rod 17c. Therefore, the structure of FIG. 13 can be used instead of FIG. 11.

Figure 14:
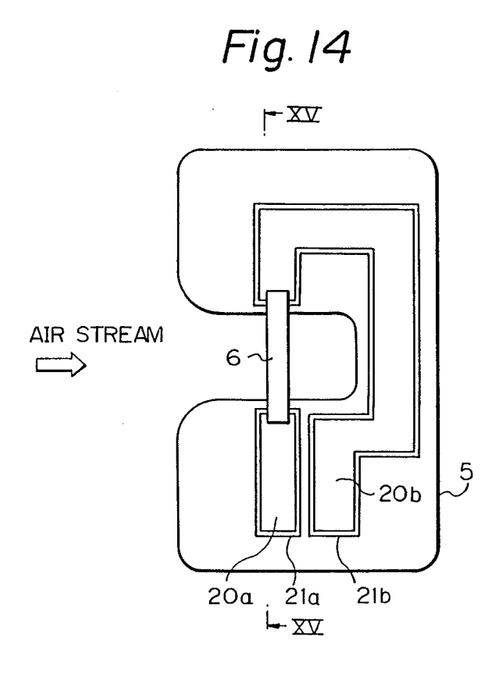
FIG. 14 is another modification of the film resistor and the supporting member of FIG. 3.
Figures 15, 16:
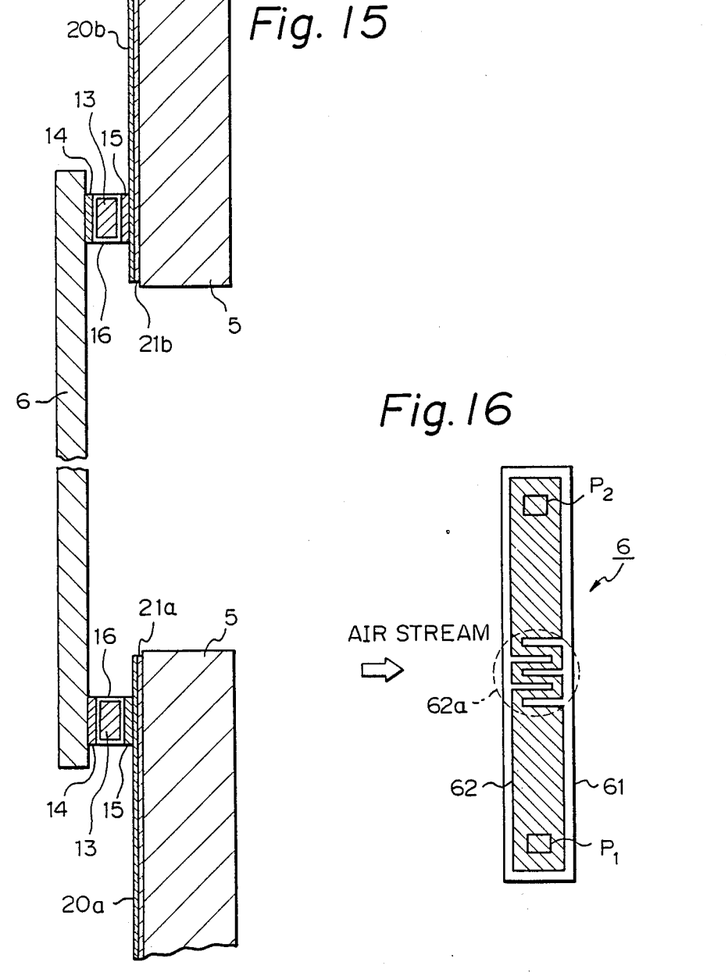
FIG. 15 is a cross-sectional view taken along the line XV—XV of FIG. 14.
FIG. 16 is an enlargement of the film resistor of FIG. 14.

The structure as illustrated in FIGS. 11(13) and 12 can be applied to a structure in which both ends of the film resistor 6 are fixed to the supporting member 5. That is, as illustrated in FIGS. 14 and 15, conductive layers 20a and 20b are formed via insulating layers 21a and 21b on the supporting members 5. The ends of the film resistor 6 as illustrated in FIG. 16 are fixed by the two adiabatic members 13 covered by the conductive layers 16 to the conductive layers 20a and 20b.

Figure 17A:
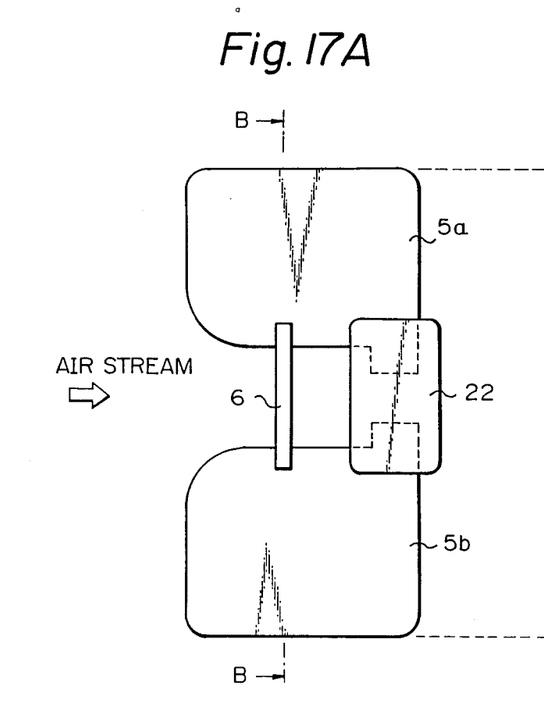
FIG. 17A is a still another modification of the film resistor and the supporting member of FIG. 1.
Figure 17B:
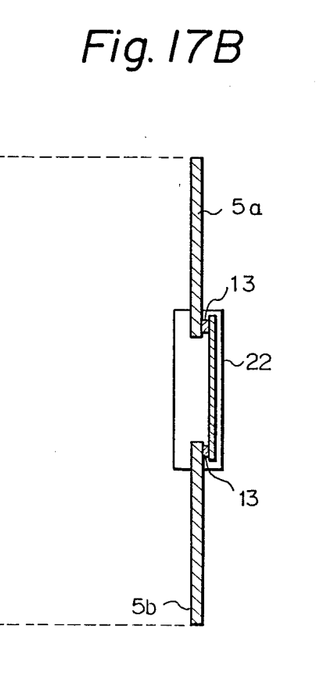
FIG. 17B is a cross-sectional view taken along the line B—B of FIG. 17A.

FIG. 17A is a modification of FIG. 14, and FIG. 17B is a cross-sectional view taken along the line B—B of FIG. 17A. In FIGS. 17A and 17B, the conductive layers 20a and 20b, and the insulating layers 21a and 21b of FIG. 14 are not provided, but instead, two conductive supporting members 5a and 5b are separated from each other, and are supported by an insulating supporting member 22. Thus, the ends of the film resistor 6 are connected electrically to the conductive supporting members 5a and 5b, respectively.

Note that, the present invention can be applied to flow rate sensors other than airflow rate sensors, such as liquid flow rate sensors. Further, the present invention can be applied to a digital (pulse) type flow rate sensor controlled by a trigger pulse. That is, in this sensor, when such a trigger pulse is given to initiate heating of a heater resistor, then the heating of the heater resistor continues until a constant difference in temperature between two temperature-dependent resistors is generated, or until the downstream temperature-dependent resistor reaches a constant value. In this case, the heating time period is detected as the mass flow rate of air or the volume flow rate of air. Such a trigger pulse control has an advantage in that the power dissipation is good. Note that such a trigger pulse control is possible in a direct-heated flow rate sensor.

As explained above, according to the present invention, since the adhesive member between the film resistor and the adiabatic member, and the adhesive member between the adiabatic member and the supporting member are conductive, the adiabatic effect is dependent upon only the adiabatic member. Thus, the response characteristics and dynamic range of the sensor are not fluctuated by the manufacturing conditions thereof.

We claim:

1. A direct-heated flow measuring apparatus for measuring a flow rate within a passage, comprising:
    a film resistor including a substrate and a resistance layer formed at said substrate, said resistance layer having a portion for generating heat and detecting the temperature thereof;
    an thermally insulating member;
    a first adhesive member, having a better thermal conductivity than said thermally insulating member, for adhering said film resistor to said thermally insulating member;
    a supporting member linked between said film resistor and said passage for dissipating heat from said film resistor to said passage;
    a second adhesive member, having a better thermal conductivity than said thermally insulating member, for adhering said supporting member to said thermally insulating member; and
    electric power control means, connected to said film resistor, for controlling the heat generated therefrom.

2. An apparatus as set forth in claim 1, wherein said substrate comprises monocrystalline silicon (Si).

3. An apparatus as set forth in claim 2, wherein said first adhesive member comprises an Au-Si eutectic alloy.

4. An apparatus as set forth in claim 1, wherein said supporting member is made of aluminium or copper.

5. An apparatus as set forth in claim 3, wherein said second adhesive member comprises an layer made by electroless plating, adhered to said thermally insulating member, and a Pb-Sn solder layer adhered to said nonelectrolytic metallized layer and said supporting member.

6. An apparatus as set forth in claim 1, where said thermally insulating member comprises:
    a first member having a positive thermal conductivity coefficient; and
    a second member having a negative thermal conductivity coefficient,
    whereby said thermally insulating member has an approximately uniform thermal conductivity coefficient with respect to temperature.

7. An apparatus as set forth in claim 6, wherein said positive thermal conductivity coefficient first member and said negative thermal conductivity coefficient second member are laminated to each other.

8. An apparatus as set forth in claim 6, wherein said positive thermal conductivity coefficient first and said negative thermal conductivity second member are mixed.

9. An apparatus as set forth in claim 6, wherein said positive thermal conductivity coefficient first member comprises a resin such as polyimid.

10. An apparatus as set forth in claim 6, wherein said negative thermal conductivity coefficient second member comprises a ceramic such as mullite.

11. An apparatus as set forth in claim 6, wherein said negative thermal conductivity coefficient second member comprises glass.

12. An apparatus as set forth in claim 1, further comprising flexible connections linked between said resistance layer and said electric power control means.

13. An apparatus as set forth in claim 1, further comprising a conductive layer, formed on the surface of said thermally insulating member, for electrically connecting said resistance layer to said electric power control means.

14. An apparatus as set forth in claim 1, further comprising a conductive rod passing through said thermally insulating member, said conductive rod electrically connecting said resistance layer to said electric power control means.

15. An apparatus as set forth in claim 1, wherein said supporting member comprises:
    two separated conductive members each connected electrically to ends of said resistance layer; and
    an insulating member, linked between said conductive members, for avoiding an electrical short circuit therebetween and aligning said conductive members.

* * * * *